(12) United States Patent
Wang et al.

(10) Patent No.: US 12,630,653 B2
(45) Date of Patent: May 19, 2026

(54) PREPARATION METHOD OF MODIFIED STARCH-LIPID BINARY COMPLEXES

(71) Applicant: Tianjin University of Science and Technology, Tianjin (CN)

(72) Inventors: Shujun Wang, Tianjin (CN); Jinwei Wang, Tianjin (CN); Fei Ren, Tianjin (CN); Chen Chao, Tianjin (CN); Jinglin Yu, Tianjin (CN)

(73) Assignee: Tianjin University of Science and Technology, Tianjin (CN)

( * ) Notice: Subject to any disclaimer, the term of this patent is extended or adjusted under 35 U.S.C. 154(b) by 517 days.

(21) Appl. No.: 18/137,431

(22) Filed: Apr. 20, 2023

(65) Prior Publication Data

US 2023/0257482 A1     Aug. 17, 2023

Related U.S. Application Data

(63) Continuation of application No. PCT/CN2022/116468, filed on Sep. 1, 2022.

(30) Foreign Application Priority Data

Oct. 8, 2021     (CN) .......................... 202111170698.8

(51) Int. Cl.
*C08B 31/04*          (2006.01)
*A23L 29/219*        (2016.01)

(52) U.S. Cl.
CPC ............ *C08B 31/04* (2013.01); *A23L 29/219* (2016.08)

(58) Field of Classification Search
CPC ................................ C08B 31/04; A23L 29/219
See application file for complete search history.

(56) References Cited

FOREIGN PATENT DOCUMENTS

| | | |
|---|---|---|
| CN | 105166885 A | 12/2015 |
| CN | 110372917 A | 10/2019 |
| CN | 111171386 A | 5/2020 |
| CN | 111333740 A * | 6/2020 ............. C08B 31/04 |

OTHER PUBLICATIONS

Wang et al., J. Agric. Food Chem., 2021, 69, p. 14938-14950, published Nov. 10, 2021. (Year: 2021).*
Siwei Sun, Research on the preparation and Physicochemical Properties of OSA Modified Lotus Seed Starch-Conjugated Linoleic Acid Complex, Chinese Selected Doctoral Dissertations and Master's These Full-Text Databases (Doctoral), Engineering Science & Technology 1, Feb. 15, 2021, No. 2.
International Search Report of PCT Patent Application No. PCT/CN2022/116468 issued on Dec. 14, 2022.

* cited by examiner

*Primary Examiner* — Jonathan S Lau

(57) ABSTRACT

Preparation method of modified starch-lipid binary complexes is provided. The preparation method includes: subjecting native starch to chemical modification utilizing octenyl succinic anhydride; and preparing a starch suspension with a concentration of 7-20% by taking starch octenyl succinate and lipid as raw materials at a mass ratio of (10-200):1. The modified starch-lipid binary complexes can be efficiently prepared through an aqueous phase system. According to the preparation method, not only the complexing of starch with fatty acid or monoglyceride but also the complexing of starch with diglyceride can be effectively promoted during food processing. Compared with the traditional technologies, the starch-lipid complexes prepared based on the present disclosure are more efficient, better structured, and more potentially useful for enhancing food quality to improve human nutritional health.

3 Claims, 4 Drawing Sheets

PREPARATION METHOD OF MODIFIED STARCH-LIPID BINARY COMPLEXES

CROSS REFERENCE TO RELATED APPLICATION

This application is a continuation application of PCT international application No. PCT/CN2022/116468 filed on Sep. 1, 2022 and entitled "Preparation method of modified starch-lipid binary complexes", which claims the benefit of Chinese Patent Application No. 202111170698.8 filed on Oct. 8, 2021. The contents of all of the aforementioned applications are incorporated by reference herein in their entirety.

FIELD OF TECHNOLOGY

The present disclosure belongs to the technical field of food processing and specifically relates to the preparation method of modified starch-lipid binary complexes.

BACKGROUND

As a supramolecular helical structure formed by the self-assembly of amylose and lipids during thermal processing, starch-lipid complexes have been widely found in processed starchy food. Due to their unique functionalities and nutritional health properties, starch-lipid complexes have been widely concerned. For example, starch-lipid complexes can reduce the hardness of starch, delay the retrogradation of the starch, improve the properties of the gel, reduce the digestibility of the starch, and have excellent fermentation properties. The formation and structural stability of the starch-lipid complexes are affected by various factors, including sources of the starch, structures of the lipid, and reaction conditions. The structure and functional properties of the starch-lipid complexes are affected by the length of an alkyl chain, the unsaturation degree, and the solubility of the lipid. According to studies, it is shown that an amylose-lipid complex with a single helical structure can be formed by fatty acids and monoglycerides with native starch. However, a complex cannot be formed by diglycerides or triglycerides with native starch. In addition, since the fatty acids and the monoglycerides have poor water solubility, the complexing efficiency of the native starch and the substances is not high, so the preparation and application of related complexes are limited. According to the patent application CN110372917A, a method for preparing a starch-lipid complex is provided. On the basis of the emulsifying activity of an exogenous additive (β-lactoglobulin), the solubility and dispersion of lipids in water are improved, and accordingly, a ternary complex is obtained. However, according to the patent application CN110372917A, only a complex of the native starch and a fatty acid or a monoglyceride can be prepared by the addition of an exogenous substance (β-lactoglobulin), and a complex of the native starch and a diglyceride cannot be prepared. In addition, since the β-lactoglobulin has a high cost and a limited effect of improving the complexing efficiency of a long-chain fatty acid and the starch, it is urgent to find a new method to improve the complexing of the starch and the lipid. How to promote the complexing interaction between the starch and the lipid to form a complex that better meets the needs of the quality of food and the nutrition and health of the human body has become a key problem to be solved urgently in food processing and dietary nutrient regulation.

The native starch has some defects, such as insolubility in cold water and poor emulsifying ability. Therefore, the hydrophilic properties of native starch are required to be changed by a chemical modification technology. For example, starch octenyl succinate synthesized by an esterification reaction of octenyl succinic anhydride and starch contains hydrophilic and hydrophobic groups, thus having an excellent emulsifying ability.

SUMMARY

The present disclosure provides the preparation method of a binary complex by complexing interaction between native starch and a long-chain fatty acid or a diglyceride, especially a preparation method of a complex of the starch and the diglyceride.

In order to achieve the above objective, technical solutions created in the present disclosure are realized as follows.

The preparation method of modified starch-lipid binary complexes includes the following steps:

(1) preparing a modified starch with octenyl succinic anhydride comprising taking corn starch into an aqueous ionic liquid to prepare a 10 wt % starch suspension, adjusting the pH of the system to a weakly alkaline value, adding octenyl succinic anhydride drop by drop into the starch suspension to perform a modification reaction for modifying the starch at room temperature, maintaining the pH of the system to a weakly alkaline value, stirring constantly, adjusting pH of the reaction system to a weakly acidic value, and centrifuging, washing and drying to yield the modified starch with octenyl succinic anhydride.

(2) preparing a modified starch-lipid suspension comprising adding the modified starch with octenyl succinic anhydride obtained in step (1) into distilled water, conducting stirring to yield a 7-20 wt % suspension, and then adding a lipid to yield the modified starch-lipid suspension by fully stirring and homogenizing, where a mass ratio of the lipid to the modified starch on a dry basis is 1:(10-200).

(3) heating the modified starch-lipid suspension obtained in step (2) in a magnetic stirring temperature control water bath for starch gelation, cooling the reaction mixture to yield a crude complex, then freeze-drying and grinding to yield the modified starch-lipid binary complexes.

In further embodiments, in step (1), preparing the corn starch into a 10 wt % starch suspension with an aqueous ionic liquid; then adjusting the pH of the system to a pH of 8.0-8.5 with a sodium hydroxide solution with a concentration of 0.5 M; weighting octenyl succinic anhydride that accounts for 1%-9% of the mass of the starch on a dry basis, and adding drop by drop into the starch suspension within 2.5 h to perform a modification reaction for modifying the starch at a temperature of 25° C.; the modification reaction is carried out at a stirring rate of 200 rpm for 5 h; after the reaction is completed, adjusting the pH of the system to a pH of 6.0; performing centrifuging and washing for 3 times, every time the centrifuging is conducted at a centrifugal force of 5,000 g for 10 min, the washing is conducted with deionized water and 70% ethanol alternately, and then drying via vacuum at 40° C. for 12 h to yield the modified starch with octenyl succinic anhydride.

In further embodiments, the aqueous ionic liquid is prepared by mixing a 1-ethyl-3-methyl imidazole acetate ionic liquid with water at a mass ratio of 2:8.

In further embodiments, in step (2), add the modified starch with octenyl succinic anhydride prepared in step (1) into distilled water, pre-mixing for 3 minutes and stirring at a stirring rate of 200 rpm to yield an 8 wt % suspension, then adding a lipid to yield the modified starch-lipid suspension by stirring for 2 minutes at a stirring rate of 260 rpm, wherein the mass ratio of the lipid to the modified starch on a dry basis is 1:200, 1:40, 1:20, and 1:10.

In further embodiments, the lipid is a long-chain fatty acid or a glyceride.

In further embodiments, the long-chain fatty acid is palmitic acid, and the glyceride is monoglyceride palmitate or diglyceride palmitate.

In further embodiments, step (3) comprising 3A) in a preheating and uniform mixing stage, subjecting the modified starch-lipid suspension to preheating and stirring at a temperature of 50° C. at a stirring rate of 200 rpm for 2 min; 3B) in heating and reacting stage, raising the temperature to 100° C. at a heating rate of 25° C./min, and carrying out a complexing reaction at a stirring rate of 260 rpm for 1 hour; 3C) in a cooling stage, lowering the temperature to 25° C. at a cooling rate of 10° C./min and stirring at a stirring rate of 100 rpm to yield a gelatinized sample of a modified starch-lipid complex; and 3D) in a sample treating stage, rapidly placing the gelatinized sample in liquid nitrogen for cooling for 5 min, freeze-drying for 24 hours, grinding with a high-throughput liquid nitrogen freezing grinder with a rotor size of 6*Φ0.9 cm at a rotation speed of 10 cps for 10 min, and then sieving with a 100-mesh sieve to obtain the modified starch-lipid binary complexes.

According to the preparation method of the present application, binary complexes also can be prepared by starches with different plant sources (such as potato starch, wheat starch, and rice starch) and fatty acids with different chain lengths, such as lauric acid, myristic acid, and stearic acid, and corresponding monoglyceride and diglyceride.

In further embodiments, the long-chain fatty acid is lauric acid, myristic acid, and stearic acid.

In further embodiments, the starch is potato starch, wheat starch, and rice starch.

According to the preparation method of the present application for preparing starch-lipid complexes, modifying starch with octenyl succinic anhydride to improve the emulsifying ability of the starch utilizing an octenyl succinic acid group on a modified starch molecular chain, so that the key problem is solved without adding any exogenous substances that due to poor dispersion of fatty acid or diglyceride in water, the complexing reaction of the starch and the lipid is affected. The interaction between amylose and lipid, especially a long-chain fatty acid or a diglyceride, is greatly improved. Accordingly, the quantitative formation and structural stability of the complexes are significantly improved, and a binary complex of starch octenyl succinate and diglyceride palmitate is prepared for the first time.

Compared with traditional methods, the present disclosure has the following advantageous effects:

The present disclosure provides preparation method of modified starch-lipid binary complexes. The emulsifying ability of native starch is improved by chemical modification to introduce an octenyl succinic anhydride group to yield a modified starch. Through a preheating and uniform mixing stage, a heating and reaction stage, a cooling and formation stage, and a sample treating stage, a starch-long chain fatty acid complex, and a starch-diglyceride complex can be prepared by the modified starch and a fatty acid or a glyceride without adding any exogenous substances. Compared with products prepared by traditional methods, the method of the present disclosure provides a complex having an excellent thermal stability structure, solves the difficulties of low complexing efficiency of native starch and a long-chain fatty acid, and impossibility to achieve complexing interaction with a diglyceride. Through the method of the present disclosure, for the first time, a modified starch-diglyceride binary complex with specific physical and chemical properties and nutritional functions is prepared, and a breakthrough in the preparation of the starch-diglyceride binary complexes is achieved. Compared with traditional technologies, the starch-lipid complexes prepared based on the present disclosure have better quality and structure. The patent provides new insight and technical methods for the efficient preparation of starch-lipid complexes, and the prepared complexes have the potential to better enhance food quality and improve human nutritional health.

DESCRIPTION OF THE EMBODIMENTS

Figure 1:
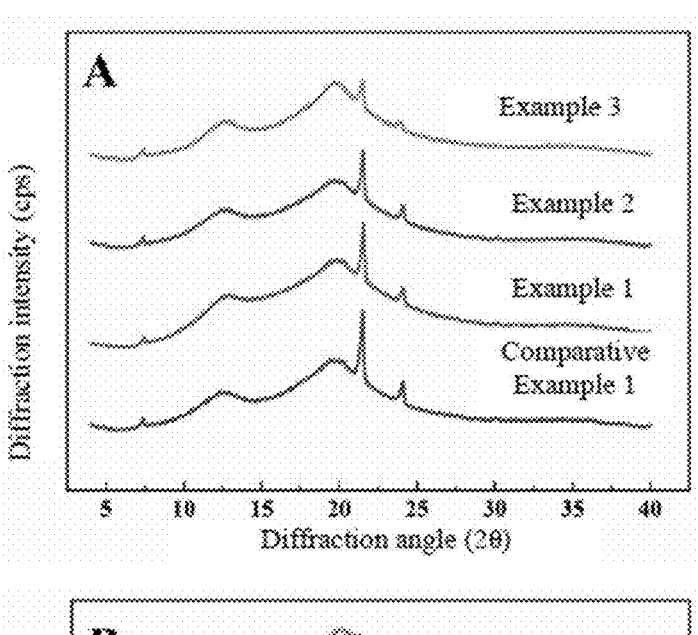
FIG. 1 (A/B/C) shows X-ray diffraction patterns in Examples 1-9 and Comparative Examples 1-3, respectively.
Figure 1:
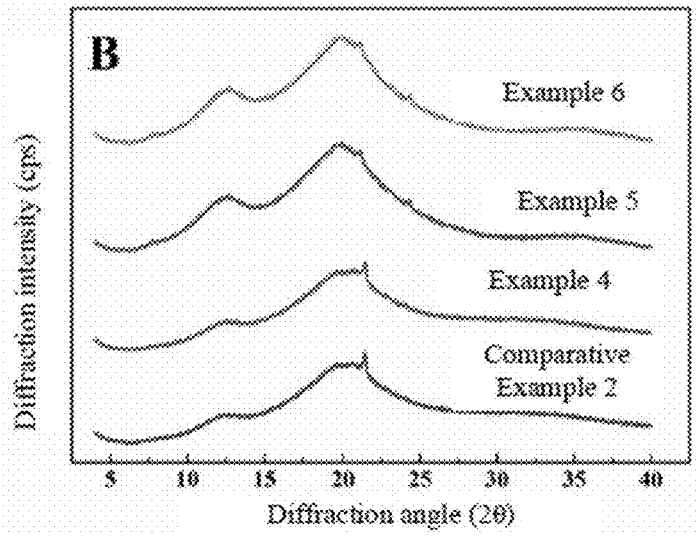
Figure 1:
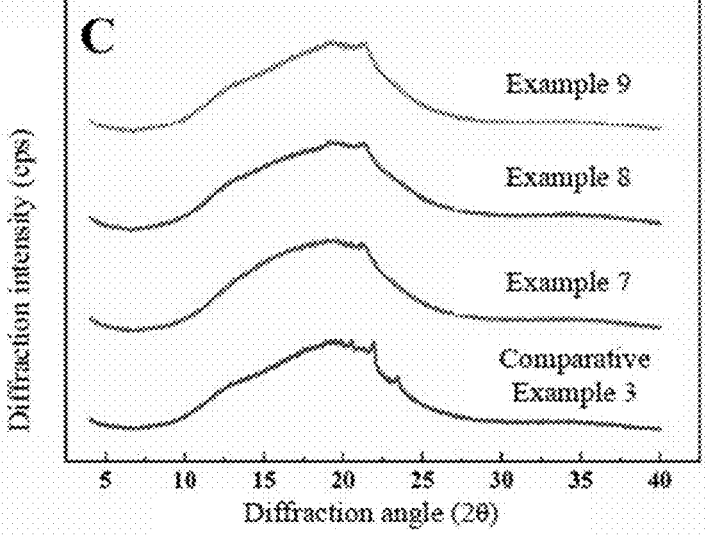

The exemplary preferred embodiments of the present disclosure are described in more detail below to further illustrate the present disclosure. Although the exemplary preferred embodiments of the present disclosure are shown in the specification, it should be understood that the present disclosure can be implemented in various forms and should not be limited by the embodiments described herein. On the contrary, the embodiments are provided to make the present disclosure understood more thoroughly and to make the scope of the present disclosure fully conveyed to technical persons in the field, to help the technical persons in the field to have a more complete, accurate, and in-depth understanding of the inventive concept and technical solutions of the present disclosure.

In some embodiments, the present application provides the preparation method of modified starch-diglyceride complexes. The native starch is modified for improving the emulsifying ability of a starch molecular chain so that the complexing of the starch and a lipid (a long-chain fatty acid and a diglyceride) is promoted, and a binary complex is prepared. In particular, the preparation of a complex of the starch octenyl succinate and the diglyceride is promoted. This achieved a breakthrough in the preparation technology of starch-diglyceride complexes. The complexes prepared by the present application have better physical and chemical properties and nutritional functions, better quality, and structure, and can potentially improve the quality of food and the regulation and improvement of the nutrition and health of the human.

EXAMPLE 1

(1) Preparation of the modified starch with octenyl succinic anhydride. Corn starch was prepared into a 10 wt % starch suspension with an aqueous ionic liquid; then a sodium hydroxide solution with a concentration of 0.5 M was added for adjusting the pH value of the system to 8.0-8.5; octenyl succinic anhydride that accounts for 1% of the mass of the starch on dry basis was weighed and added drop by drop into the system within 2.5 h for modifying the starch at a temperature of 25° C.; the modification reaction was carried out at a stirring rate of 200 rpm for 5 h; after the reaction was completed, the pH value of the system was adjusted to 6.0; centrifuging and washing were conducted to the reaction mixture for 3 times; where every time, the centrifuging was conducted for 10 min at a centrifugal force of 5,000 g; the washing was conducted with deionized water and 70% ethanol alternately; and then drying was conducted in a vacuum drying oven at 40° C. for 12 h to obtain the modified starch with octenyl succinic anhydride (starch octenyl succinate).

(2) Preparation of the modified starch-lipid suspension. The starch octenyl succinate was premixed with deionized water at a stirring rate of 200 rpm for 3 min to prepare an 8 wt % starch suspension, and then a lipid was added for stirring at a rate of 260 rpm for 2 min to yield the modified starch-lipid suspension, where a mass ratio of the lipid to the modified starch on dry basis was 1:20, and the palmitic acid (a long-chain fatty acid) was used as the lipid.

(3) Preparation method of the binary complexes includes: 3A) in a preheating and uniform mixing stage, subjecting a modified starch-lipid suspension to preheating and stirring through a precise temperature control system at 50° C. at a stirring rate of 200 rpm for 2 min; 3B) in a heating and reaction stage, raising the temperature to 100° C. at a heating rate of 25° C./min, and carrying out a complexing reaction at a stirring rate of 260 rpm for 1 h; 3C) in a cooling and formation stage, lowering the temperature to 25° C. at a cooling rate of 10° C./min and a stirring rate of 100 rpm; and 3D) in a sample treating stage, rapidly placing an obtained gelatinized sample of a modified starch-lipid complex in liquid nitrogen for cooling for 5 min, conducting freeze-drying for 24 h, conducting grinding with a high-throughput liquid nitrogen freezing grinder (with a rotor size of 6*Φ0.9 cm) at a rotation speed of 10 cps for 10 min, and then conducting sieving with a 100-mesh sieve to obtain a binary complex of the modified starch with octenyl succinic anhydride and the palmitic acid.

EXAMPLE 2

(1) Preparation of the modified starch with octenyl succinic anhydride. Corn starch was prepared into a 10 wt % starch suspension with an aqueous ionic liquid; then a sodium hydroxide solution with a concentration of 0.5 M was added for adjusting the pH value of the system to 8.0-8.5; octenyl succinic anhydride that accounts for 3% of the mass of the starch on dry basis was weighed and added drop by drop into the system within 2.5 h for modifying the starch at a temperature of 25° C.; the modification reaction was carried out at a stirring rate of 200 rpm for 5 h; after the reaction was completed, the pH value of the system was adjusted to 6.0; centrifuging and washing were conducted to the reaction mixture for 3 times; where every time, the centrifuging was conducted for 10 min at a centrifugal force of 5,000 g; the washing was conducted with deionized water and 70% ethanol alternately; and then drying was conducted in a vacuum drying oven at 40° C. for 12 h to obtain the modified starch with octenyl succinic anhydride.

(2) Preparation of the modified starch-lipid suspension and the added lipid are the same as those in Example 1.

(3) Preparation method of the binary complexes is the same as that in Example 1.

EXAMPLE 3

(1) Preparation of the modified starch with octenyl succinic anhydride. Corn starch was prepared into a 10 wt % starch suspension with an aqueous ionic liquid; then a sodium hydroxide solution with a concentration of 0.5 M was added for adjusting the pH value of the system to 8.0-8.5; octenyl succinic anhydride that accounts for 9% of the mass of the starch on dry basis was weighed and added drop by drop into the system within 2.5 h for modifying the starch at a temperature of 25° C.; the modification reaction was carried out at a stirring rate of 200 rpm for 5 h; after the reaction was completed, the pH value of the system was adjusted to 6.0; centrifuging and washing were conducted to the reaction mixture for 3 times; where every time, the centrifuging was conducted for 10 min at a centrifugal force of 5,000 g; the washing was conducted with deionized water and 70% ethanol alternately; and then drying was conducted in a vacuum drying oven at 40° C. for 12 h to obtain the modified starch with octenyl succinic anhydride.

(2) Preparation of the modified starch-lipid suspension and the added lipid are the same as those in Example 1.

(3) Preparation method of the binary complexes is the same as that in Example 1.

EXAMPLE 4

(1) Preparation of the modified starch with octenyl succinic anhydride. Corn starch was prepared into a 10 wt % starch suspension with an aqueous ionic liquid; then a sodium hydroxide solution with a concentration of 0.5 M was added for adjusting the pH value of the system to 8.0-8.5; octenyl succinic anhydride that accounts for 1% of the mass of the starch on dry basis was weighed and added drop by drop into the system within 2.5 h for modifying the starch at a temperature of 25° C.; the modification reaction was carried out at a stirring rate of 200 rpm for 5 h; after the reaction was completed, the pH value of the system was adjusted to 6.0; centrifuging and washing were conducted to the reaction mixture for 3 times; where every time, the centrifuging was conducted for 10 min at a centrifugal force of 5,000 g; the washing was conducted with deionized water and 70% ethanol alternately; and then drying was conducted in a vacuum drying oven at 40° C. for 12 h to obtain the modified starch with octenyl succinic anhydride.

(2) Preparation of the modified starch-lipid suspension. The starch octenyl succinate was premixed with deionized water at a stirring rate of 200 rpm for 3 min to prepare an 8 wt % starch suspension, and then a lipid was added for stirring at a rate of 260 rpm for 2 min to yield the modified starch-lipid suspension, where a mass ratio of the lipid to the modified starch on dry basis was 1:20, and the monoglyceride palmitate (a glyceride) was used as the lipid.

(3) Preparation method of the binary complexes includes: 3A) in a preheating and uniform mixing stage, subjecting a modified starch-lipid suspension to preheating and stirring through a precise temperature control system at 50° C. at a stirring rate of 200 rpm for 2 min; 3B) in a heating and reaction stage, raising the temperature to 100° C. at a heating rate of 25° C./min, and carrying out a complexing reaction at a stirring rate of 260 rpm for 1 h; 3C) in a cooling and formation stage, lowering the temperature to 25° C. at a cooling rate of 10° C./min and a stirring rate of 100 rpm; and 3D) in a sample treating stage, rapidly placing an obtained gelatinized sample of a modified starch-lipid complex in liquid nitrogen for cooling for 5 min, conducting freeze-drying for 24 h, conducting grinding with a high-throughput liquid nitrogen freezing grinder (with a rotor size of 6*Φ0.9 cm) at a rotation speed of 10 cps for 10 min, and then conducting sieving with a 100-mesh sieve to obtain a binary complex of the modified starch with octenyl succinic anhydride and the monoglyceride palmitate.

EXAMPLE 5

(1) Preparation of the modified starch with octenyl succinic anhydride is the same as that in Example 2.

(2) Preparation of the modified starch-lipid suspension and the added lipid are the same as those in Example 4.

(3) Preparation method of the binary complexes is the same as that in Example 4.

EXAMPLE 6

(1) Preparation of the modified starch with octenyl succinic anhydride is the same as that in Example 3.

(2) Preparation of the modified starch-lipid suspension and the added lipid are the same as those in Example 4.

(3) Preparation method of the binary complexes is the same as that in Example 4.

EXAMPLE 7

(1) Preparation of the modified starch with octenyl succinic anhydride. Corn starch was prepared into a 10 wt % starch suspension with an aqueous ionic liquid; then a sodium hydroxide solution with a concentration of 0.5 M was added for adjusting the pH value of the system to 8.0-8.5; octenyl succinic anhydride that accounts for 1% of the mass of the starch on dry basis was weighed and added drop by drop into the system within 2.5 h for modifying the starch at a temperature of 25° C.; the modification reaction was carried out at a stirring rate of 200 rpm for 5 h; after the reaction was completed, the pH value of the system was adjusted to 6.0; centrifuging and washing were conducted to the reaction mixture for 3 times; where every time, the centrifuging was conducted for 10 min at a centrifugal force of 5,000 g; the washing was conducted with deionized water and 70% ethanol alternately; and then drying was conducted in a vacuum drying oven at 40° C. for 12 h to obtain the modified starch with octenyl succinic anhydride.

(2) Preparation of the modified starch-lipid suspension. The starch octenyl succinate was premixed with deionized water at a stirring rate of 200 rpm for 3 min to prepare an 8 wt % starch suspension, and then a lipid was added for stirring at a rate of 260 rpm for 2 min to yield the modified starch-lipid suspension, where a mass ratio of the lipid to the modified starch on dry basis was 1:20, and the diglyceride palmitate (a glyceride) was used as a lipid.

(3) Preparation method of the binary complexes includes: 3A) in a preheating and uniform mixing stage, subjecting a modified starch-lipid suspension to preheating and stirring through a precise temperature control system at 50° C. at a stirring rate of 200 rpm for 2 min; 3B) in a heating and reaction stage, raising the temperature to 100° C. at a heating rate of 25° C./min, and carrying out a complexing reaction at a stirring rate of 260 rpm for 1 h; 3C) in a cooling and formation stage, lowering the temperature to 25° C. at a cooling rate of 10° C./min and a stirring rate of 100 rpm; and 3D) in a sample treating stage, rapidly placing an obtained gelatinized sample of a modified starch-lipid complex in liquid nitrogen for cooling for 5 min, conducting freeze-drying for 24 h, conducting grinding with a high-throughput liquid nitrogen freezing grinder (with a rotor size of 6*Φ0.9 cm) at a rotation speed of 10 cps for 10 min, and then conducting sieving with a 100-mesh sieve to obtain a binary complex of the modified starch with octenyl succinic anhydride and the diglyceride palmitate.

EXAMPLE 8

(1) Preparation of the modified starch with octenyl succinic anhydride. Corn starch was prepared into a 10 wt % starch suspension with an aqueous ionic liquid; then a sodium hydroxide solution with a concentration of 0.5 M was added for adjusting the pH value of the system to 8.0-8.5; octenyl succinic anhydride that accounts for 3% of the mass of the starch on dry basis was weighed and added drop by drop into the system within 2.5 h for modifying the starch at a temperature of 25° C.; the modification reaction was carried out at a stirring rate of 200 rpm for 5 h; after the reaction was completed, the pH value of the system was adjusted to 6.0; centrifuging and washing were conducted to the reaction mixture for 3 times; where every time, the centrifuging was conducted for 10 min at a centrifugal force of 5,000 g; the washing was conducted with deionized water and 70% ethanol alternately; and then drying was conducted in a vacuum drying oven at 40° C. for 12 h to obtain the modified starch with octenyl succinic anhydride.

(2) Preparation of the modified starch-lipid suspension and the added lipid are the same as those in Example 7.

(3) Preparation method of the binary complexes is the same as that in Example 7.

EXAMPLE 9

(1) Preparation of the modified starch with octenyl succinic anhydride. Corn starch was prepared into a 10 wt % starch suspension with an aqueous ionic liquid; then a sodium hydroxide solution with a concentration of 0.5 M was added for adjusting the pH value of the system to 8.0-8.5; octenyl succinic anhydride that accounts for 9% of the mass of the starch on dry basis was weighed and added drop by drop into the system within 2.5 h for modifying the starch at a temperature of 25° C.; the modification reaction was carried out at a stirring rate of 200 rpm for 5 h; after the reaction was completed, the pH value of the system was adjusted to 6.0; centrifuging and washing were conducted to the reaction mixture for 3 times; where every time, the centrifuging was conducted for 10 min at a centrifugal force of 5,000 g; the washing was conducted with deionized water and 70% ethanol alternately; and then drying was conducted in a vacuum drying oven at 40° C. for 12 h to obtain the modified starch with octenyl succinic anhydride.

(2) Preparation of the modified starch-lipid suspension and the added lipid are the same as those in Example 7.

(3) Preparation method of the binary complexes is the same as that in Example 7.

COMPARATIVE EXAMPLE 1

(1) Native corn starch was premixed with deionized water at a stirring rate of 200 rpm for 3 min to prepare an 8 wt % starch suspension, and then a lipid was added for stirring at a rate of 260 rpm for 2 min to yield the starch-lipid suspension, where a mass ratio of the lipid to the native starch on dry basis was 1:20, and the palmitic acid (a long-chain fatty acid) was used as the lipid.

(2) Preparation method of the binary complexes is the same as that in Example 1.

COMPARATIVE EXAMPLE 2

(1) Native corn starch was premixed with deionized water at a stirring rate of 200 rpm for 3 min to prepare an 8 wt % starch suspension, and then a lipid was added for stirring at a rate of 260 rpm for 2 min to yield the starch-lipid suspension, where a mass ratio of the lipid to the native starch on dry basis was 1:20, and the monoglyceride palmitate (a glyceride) was used as a lipid.

(2) Preparation method of the binary complexes is the same as that in Example 4.

COMPARATIVE EXAMPLE 3

(1) Native corn starch was premixed with deionized water at a stirring rate of 200 rpm for 3 min to prepare an 8 wt % starch suspension, and then a lipid was added for stirring at a rate of 260 rpm for 2 min to yield the starch-lipid suspension, where a mass ratio of the lipid to the native starch on dry basis was 1:20, and the diglyceride palmitate (a glyceride) was used as a lipid.

(2) Preparation method of the binary complexes is the same as that in Example 7. Relevant test results of substances prepared in all the examples and comparative examples by the method of the present disclosure are as follows.

(1) The degree of substitution (DS) of starch modified by different percentages (1%, 3%, and 9%) of octenyl succinic anhydride is determined.

2.0 g of a sample was weighed, put into a 250 ml beaker, moistened with 10 ml of isopropanol, and stirred for 10 min. 15 mL of a 2.5 mol/L hydrochloric-isopropanol solution was added and stirred magnetically for 30 min. Then, 50 mL of a 90% isopropanol solution was added and stirred continuously for 10 min. The sample was transferred to a Buchner funnel and washed with 90% isopropanol until no Cl⁻ was found (tested with 0.1 mol/L silver nitrate). Then, the sample was transferred to a 500 mL beaker, deionized water was added to reach 300 mL, and treatment was conducted in a boiling water bath for 20 min. 2 drops of a phenolphthalein reagent were dropped, and a 0.1 mol/L sodium hydroxide solution was added for titration under heating until the solution was turned into pink and the color was not changed within 30 s. The following formula is used for calculation: degree of substitution $(DS)=0.1624*N/(1-0.21*N)$, where N refers to the mass of the 0.1 mol/L sodium hydroxide standard solution consumed (mmol).

(2) The emulsifying ability of modified starch is determined.

A starch sample (1.5%, w/w) suspension was heated in a boiling water bath and stirred for 20 min. Soybean oil (which accounts for 5% of the mass of the starch suspension) was added to the starch suspension in a high-speed homogenizer (Ultra-Turrax T18) to prepare an oil-in-water (O/W) emulsion. Homogenization was conducted at 12,000 rpm at room temperature for a total of 4 times with 1.5 min for each time. Then, 50 µL of an emulsion solution was evenly mixed with 5 mL of 0.1% sodium dodecyl sulfate to form a fine emulsion solution. The absorbance $(A_0)$ at 500 nm was measured with 0.1% sodium dodecyl sulfate as a blank control to determine the emulsifying activity. After an emulsion sample was placed for 20 min, the absorbance $(A_{20})$ was measured again at 500 nm. The emulsifying stability is calculated according to the following formula: emulsifying stability $(min)=20*A_0/(A_0-A_{20})$.

The above results are shown in Table 1. With the increase of the added percentage of the octenyl succinic anhydride (1%-9%), the degree of substitution of an octenyl succinic anhydride group in the modified starch is gradually increased from 0.0071 to 0.0489, and the highest emulsifying activity and emulsifying ability reach 2.09 min and 1213.5 min, respectively, which are significantly improved in comparison with native starch.

TABLE 1

| | Degree of substitution, emulsifying activity, and emulsifying ability of modified starch | | |
|---|---|---|---|
| Name | Degree of substitution | Emulsifying activity | Emulsifying stability (min) |
| Native starch | / | 0.43 ± 0.02e | 126.6 ± 9.5e |
| 1%-Modified starch | 0.0071 ± 0.0001c | 0.94 ± 0.07d | 207.6 ± 4.2d |
| 3%-Modified starch | 0.0210 ± 0.0003b | 1.43 ± 0.10b | 676.3 ± 8.2b |
| 9%-Modified starch | 0.0489 ± 0.0001a | 2.09 ± 0.09a | 1213.5 ± 80.7a |

Note:
The data in the table are represented as mean ± standard deviation; the same suffix letter indicates no significant difference and different letters indicate significant differences (p < 0.05); and "/" indicates that no data is detected.

(3) The complexing index of a complex sample is determined.

A starch-lipid complex (0.4 g) was weighed and added into a 50 mL centrifuge tube, and then distilled water was added to reach a total weight of 5.0 g. After vortex treatment was conducted, a uniform suspension was heated in a boiling water bath at a magnetic stirring rate of 200 rpm until complete gelatinization of starch. After cooling was conducted to room temperature, 25 mL of distilled water was added, and uniform vortex mixing was conducted for 2 min before centrifugation (3,000 g, 15 min). 600 µL of supernatant was taken out and transferred to a test tube, and 15 mL of distilled water and 2 mL of an iodine solution (prepared by adding 2.0% of KI and 1.3% of $I_2$ in distilled water) were added. The ultraviolet absorbance was measured at 690 nm. The native corn starch treated with the above method was used as a control. The complexing index is calculated according to the following formula: complexing index $(\%)=100*(absorbance_{control}-absorbance_{starch-lipid})/absorbance_{control}$.

The above results are shown in Table 2. In the comparative examples, after the native starch is subjected to a complexing reaction with palmitic acid, monoglyceride palmitate, and diglyceride palmitate separately, the complexing interaction between the native starch and the monoglyceride palmitate (in Comparative Example 2) is higher than that between the native starch and the palmitic acid (in Comparative Example 1), and a complex of the native starch and the diglyceride palmitate (in Comparative Example 3) is not produced. After the native starch is modified by the octenyl succinic anhydride, the complexing effect of the modified starch and various lipids is enhanced. Compared with Comparative Example 1 and Comparative Example 3, the complexing interaction in Examples 1-3 and Examples 7-9 is significantly enhanced, the complexing index is significantly increased, and the complexing index in Comparative Example 1 or Comparative Example 3 is increased from 21.6% or 8.6% to 93.3% or 93.2%. Moreover, with the increase of the modification degree (degree of substitution) of the octenyl succinic anhydride, the effect of improving the complexing index of the modified starch and a long-chain fatty acid or a glyceride, especially the efficiency of complexing interaction with the diglyceride palmitate (in Examples 7-9), is better.

TABLE 2

| | Complexing index of starch-lipid binary complexes (%) | | |
|---|---|---|---|
| | | Complexing index (%) | |
| Name | Palmitic acid | Monoglyceride palmitate | Diglyceride palmitate |
| Native starch | Comparative Example 1 21.6 ± 0.9d | Comparative Example 2 89.1 ± 0.8d | Comparative Example 3 8.6 ± 0.7d |

TABLE 2-continued

| Complexing index of starch-lipid binary complexes (%) | | |
| --- | --- | --- |
| | Complexing index (%) | | |
| Name | Palmitic acid | Monoglyceride palmitate | Diglyceride palmitate |
| 1%-Modified starch | Example 1 79.6 ± 0.4c | Example 4 91.2 ± 0.3c | Example 7 80.3 ± 0.5c |
| 3%-Modified starch | Example 2 91.4 ± 0.2b | Example 5 93.0 ± 0.4b | Example 8 90.5 ± 0.6b |
| 9%-Modified starch | Example 3 93.3 ± 0.3a | Example 6 95.1 ± 0.3a | Example 9 93.2 ± 0.4a |

Note:
The data in the table are represented as mean ± standard deviation, and the same suffix letter indicates no significant difference and different letters indicate significant differences ($p < 0.05$).

(4) The crystal structure of a native starch-lipid complex and a modified starch-lipid complex is detected by using an X-ray diffractometry (D8 Advance) of Bruker in Germany (as shown in FIG. 1). According to test results, it is shown that compared with binary complexes prepared from the native starch in Comparative Examples 1-3, binary complexes prepared from the starch octenyl succinate in Examples 1-3, Examples 4-6, and Examples 7-9 have stronger characteristic diffraction peaks (12.9° and) 19.8° of V-type crystallites. It is indicated that the binary complexes prepared from the modified starch in the examples consist of V-type crystalline complexes with stable structures and large numbers, and with the improvement of the emulsifying activity of the starch modified by octenyl succinic anhydride, the structure and number of the binary complexes are also gradually stabilized and improved.

Figure 2:
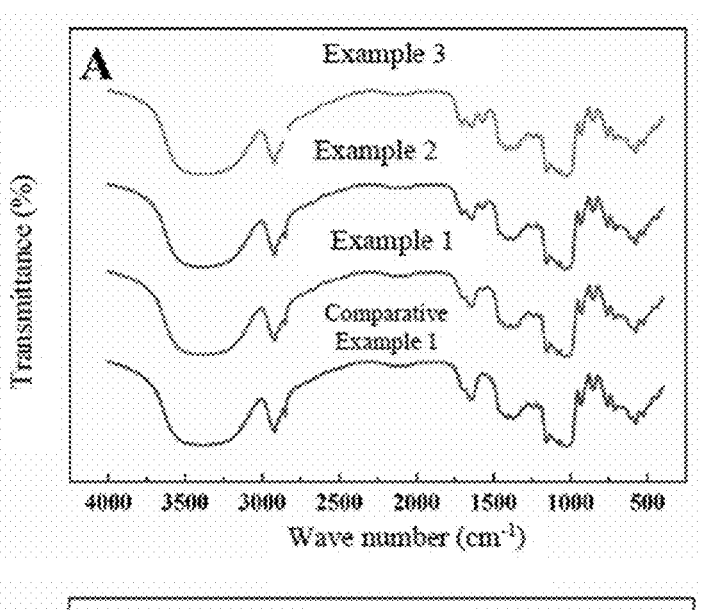
FIG. 2 (A/B/C) shows Fourier transform infrared spectra in Examples 1-9 and Comparative Examples 1-3, respectively.
Figure 2:
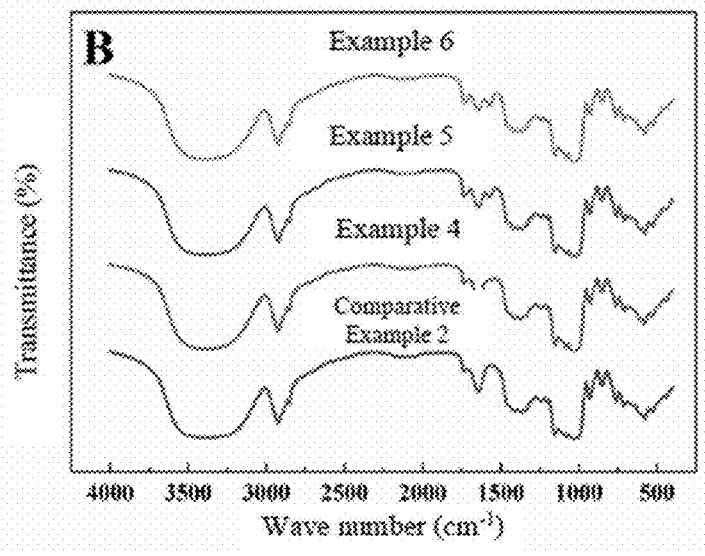
Figure 2:
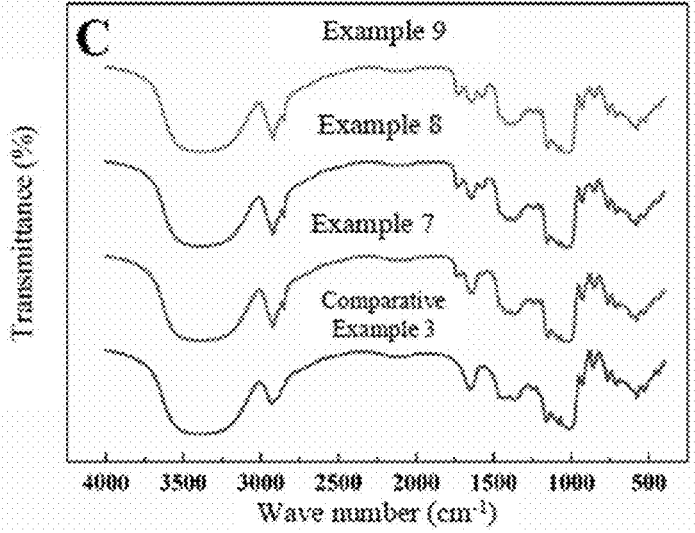

(5) The short-range molecular ordered structure of a native starch-lipid complex and a modified starch-lipid complex is detected by using a Fourier transform infrared spectrometer (IS50) of Bruker in Germany (as shown in FIG. 2 and Table 3). According to test results, it is shown that compared with the binary complexes prepared from the native starch in Comparative Examples 1-3, the binary complexes prepared from the starch octenyl succinate in Examples 1-3, Examples 4-6, and Examples 7-9 have better short-range molecular order, and with the increase of the degree of substitution of the starch modified by octenyl succinic anhydride, the short-range molecular order of the binary complexes is significantly improved. The IR ratio of absorbance at 1047/1022 cm-1 of the binary complexes increased, indicating that the short-range structural order of the binary complexes of the present application was significantly improved.

TABLE 3

| IR ratio of absorbances at 1047/1022 cm$^{-1}$ of the starch-lipid binary complexes | | |
| --- | --- | --- |
| | IR ratio of absorbances at 1047/1022 cm$^{-1}$ | | |
| Name | Palmitic acid | Monoglyceride palmitate | Diglyceride palmitate |
| Native starch | Comparative Example 1 0.50 ± 0.01d | Comparative Example 2 0.65 ± 0.00d | Comparative Example 3 0.41 ± 0.01d |
| 1%-Modified starch | Example 1 0.62 ± 0.01c | Example 4 0.67 ± 0.01c | Example 7 0.59 ± 0.02c |
| 3%-Modified starch | Example 2 0.67 ± 0.00b | Example 5 0.69 ± 0.01b | Example 8 0.62 ± 0.01b |

TABLE 3-continued

| IR ratio of absorbances at 1047/1022 cm$^{-1}$ of the starch-lipid binary complexes | | |
| --- | --- | --- |
| | IR ratio of absorbances at 1047/1022 cm$^{-1}$ | | |
| Name | Palmitic acid | Monoglyceride palmitate | Diglyceride palmitate |
| 9%-Modified starch | Example 3 0.69 ± 0.02a | Example 6 0.72 ± 0.01a | Example 9 0.67 ± 0.01a |

Note:
The data in the table are represented as mean ± standard deviation, and the same suffix letter indicates no significant difference and different letters indicate significant differences ($p < 0.05$).

Figure 3:
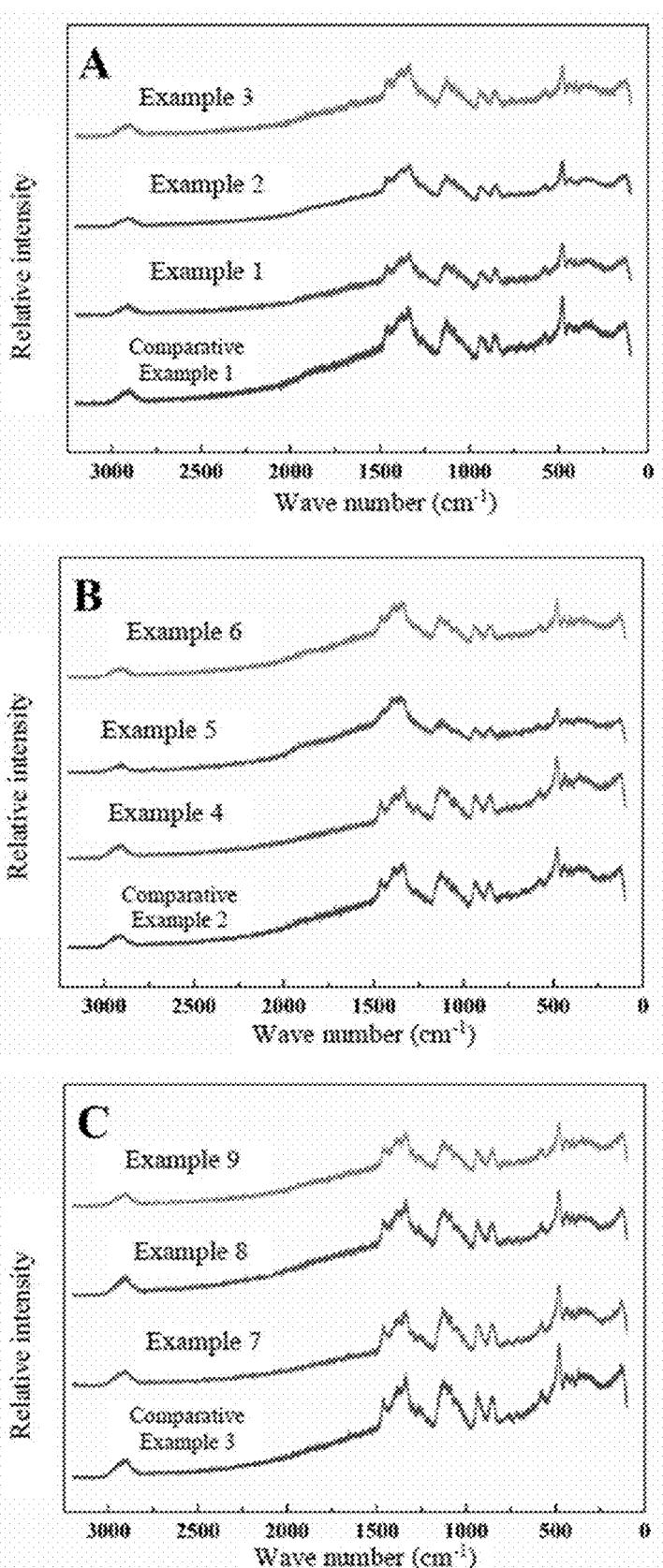
FIG. 3 (A/B/C) shows laser confocal Raman spectra in Examples 1-9 and Comparative Examples 1-3, respectively.

(6) The short-range ordered structure of a native starch-lipid complex and a modified starch-lipid complex is detected by using a laser confocal Raman imaging spectrometer (Renishaw Invia) of Renishaw in Britain (as shown in FIG. 3 and Table 4). According to test results, it is shown that compared with the binary complexes prepared from the native starch in Comparative Examples 1-3, the binary complexes prepared from the starch octenyl succinate in Examples 1-3, Examples 4-6, and Examples 7-9 have better short-range molecular order, and with the increase of the degree of substitution of the starch modified by octenyl succinic anhydride, the short-range molecular order of the binary complexes is significantly improved. The full width at half-maximum at 480 cm-1 of the complexes decreased, indicating that the short-range structure order of the binary complexes of the present application was significantly improved.

TABLE 4

| Full width at half-maximum at 480 cm$^{-1}$ of the starch-lipid binary complexes | | |
| --- | --- | --- |
| | Full width at half-maximum at 480 cm$^{-1}$ | | |
| Name | Palmitic acid | Monoglyceride palmitate | Diglyceride palmitate |
| Native starch | Comparative Example 1 20.53 ± 0.29d | Comparative Example 2 17.64 ± 0.29d | Comparative Example 3 23.95 ± 0.74d |
| 1%-Modified starch | Example 1 18.56 ± 0.25c | Example 4 16.67 ± 0.16c | Example 7 19.07 ± 0.06c |
| 3%-Modified starch | Example 2 17.64 ± 0.21b | Example 5 15.90 ± 0.08b | Example 8 18.34 ± 0.19b |
| 9%-Modified starch | Example 3 16.08 ± 0.11a | Example 6 15.58 ± 0.28a | Example 9 17.38 ± 0.06a |

Note:
The data in the table are represented as mean ± standard deviation, and the same suffix letter indicates no significant difference and different letters indicate significant differences ($p < 0.05$).

Figure 4:
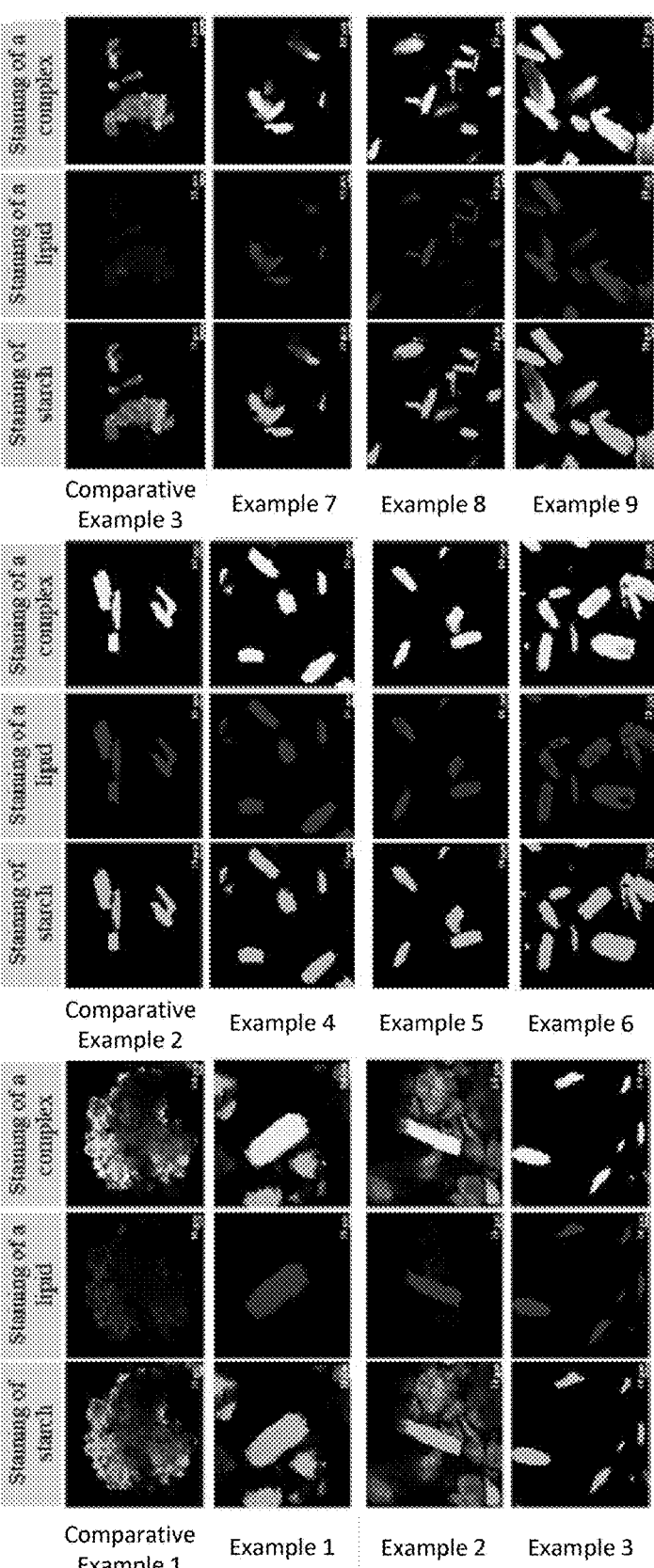
FIG. 4 shows laser scanning confocal staining images in Examples 1-9 and Comparative Examples 1-3, respectively.

(7) The morphology and structure of actual samples of a native starch-lipid complex and a modified starch-lipid complex are analyzed by using a laser scanning confocal microscope (TCSSP5) of Leica in Germany (as shown in FIG. 4). According to test results, it is shown that (a starch structure shows green fluorescence, a lipid structure shows red fluorescence and a complex structure shows yellow fluorescence) the samples of the binary complexes prepared from the native starch in Comparative Examples 1-3 show poor aggregates or mixtures (as shown by green fluorescence) in actual morphology, and although the sample in Comparative Example 2 has a complex with a rod-shaped structure, the number of the complexes is relatively small. However, the samples of the binary complexes prepared from the starch octenyl succinate in Examples 1-3, Examples 4-6, and Examples 7-9 show a larger number of complexes with a real rod-shaped morphology and structure (a rod-like structure as shown by yellow fluorescence), and all the samples in Example 3, Example 6, and Example 9 have more binary complexes. A binary complex of the starch octenyl succinate and a lipid is prepared by the method of the present disclosure for the first time, and the real morphology and structure are photographed.

(8) Thermal properties of a native starch-lipid complex and a modified starch-lipid complex are analyzed by using a high-sensitivity differential scanning calorimeter (200 F3) of Netzsch in Germany. The above results are shown in Table 5. According to the analysis of test results, it is shown that a binary complex of starch octenyl succinate and a lipid has a better melting temperature ($T_{pII}$) and a larger enthalpy value ($\Delta H$). Compared with the complexes prepared from the native starch (in Comparative Examples 1-3), the complexes in Examples 1-3, Examples 4-6, and Examples 7-9 have excellent thermal stability and more ordered crystal structures.

EXAMPLE 10

(1) Preparation of the modified starch with octenyl succinic anhydride. Corn starch was prepared into a 10 wt % starch suspension with an aqueous ionic liquid; then a sodium hydroxide solution with a concentration of 0.5 M was added for adjusting the pH value of the system to 8.0-8.5; octenyl succinic anhydride that accounts for 1% of the mass of the starch on dry basis was weighed and added drop by drop into the system within 2.5 h for modifying the starch at a temperature of 25° C.; the modification reaction was carried out at a stirring rate of 200 rpm for 5 h; after the reaction was completed, the pH value of the system was adjusted to 6.0; centrifuging and washing were conducted to the reaction mixture for 3 times; where every time, the centrifuging was conducted for 10 min at a centrifugal force of 5,000 g; the washing was conducted with deionized water and 70% ethanol alternately; and then drying was conducted in a vacuum drying oven at 40° C. for 12 h to obtain the modified starch with octenyl succinic anhydride.

(2) Preparation of the modified starch-lipid suspension. The starch octenyl succinate was premixed with deionized water at a stirring rate of 200 rpm for 3 min to prepare a 7 wt % starch suspension, and then a lipid was added for stirring at a rate of 260 rpm for 2 min to yield the modified starch-lipid suspension, where a mass ratio of the lipid to the modified starch on dry basis was 1:10, and the diglyceride palmitate (a glyceride) was used as the lipid.

(3) Preparation method of the binary complexes is the same as that in Example 4.

EXAMPLE 11

(1) Preparation of the modified starch with octenyl succinic anhydride. Corn starch was prepared into a 10 wt % starch suspension with an aqueous ionic liquid; then a sodium hydroxide solution with a concentration of 0.5 M was added for adjusting the pH value of the system to 8.0-8.5; octenyl succinic anhydride that accounts for 1% of the mass of the starch on dry basis was weighed and added drop by drop into the system within 2.5 h for modifying the starch at a temperature of 25° C.; the modification reaction was carried out at a stirring rate of 200 rpm for 5 h; after the reaction was completed, the pH value of the system was adjusted to 6.0; centrifuging and washing were conducted to the reaction mixture for 3 times; where every time, the centrifuging was conducted for 10 min at a centrifugal force of 5,000 g; the washing was conducted with deionized water and 70% ethanol alternately; and then drying was conducted in a vacuum drying oven at 40° C. for 12 h to obtain the modified starch with octenyl succinic anhydride.

(2) Preparation of the modified starch-lipid suspension. The starch octenyl succinate was premixed with deionized water at a stirring rate of 200 rpm for 3 min to prepare a 20 wt % starch suspension, and then a lipid was added for stirring at a rate of 260 rpm for 2 min to yield the modified starch-lipid suspension, where a mass ratio of the lipid to the modified starch on dry basis was 1:40, and the diglyceride palmitate (a glyceride) was used as the lipid.

(3) Preparation method of the binary complexes is the same as that in Example 4.

EXAMPLE 12

(1) Preparation of the modified starch with octenyl succinic anhydride. Corn starch was prepared into a 10 wt % starch suspension with an aqueous ionic liquid; then a sodium hydroxide solution with a concentration of 0.5 M was added for adjusting the pH value of the system to 8.0-8.5; octenyl succinic anhydride that accounts for 1% of the mass of the starch on dry basis was weighed and added drop by drop into the system within 2.5 h for modifying the starch at a temperature of 25° C.; the modification reaction was carried out at a stirring rate of 200 rpm for 5 h; after the reaction was completed, the pH value of the system was adjusted to 6.0; centrifuging and washing were conducted to the reaction mixture for 3 times; where every time, the centrifuging was conducted for 10 min at a centrifugal force of 5,000 g; the washing was conducted with deionized water and 70% ethanol alternately; and then drying was conducted in a vacuum drying oven at 40° C. for 12 h to obtain the modified starch with octenyl succinic anhydride.

(2) Preparation of the modified starch-lipid suspension. The starch octenyl succinate was premixed with deionized water at a stirring rate of 200 rpm for 3 min to prepare an 8 wt % starch suspension, and then a lipid was added for stirring at a rate of 260 rpm for 2 min to yield the modified starch-lipid suspension, where a mass ratio of the lipid to the modified starch on dry basis was 1:200, and the diglyceride palmitate (a glyceride) was used as the lipid.

(3) Preparation method of the binary complexes is the same as that in Example 4. After detection, various indexes of the binary complexes prepared in the above three examples indicate that the binary complexes of examples 10-12 are better than those prepared by complexing with the common starch. Moreover, the preparation method of the present disclosure is simple and easy to operate.

Based on the analysis of the above test data and results, the present disclosure provides the preparation method of modified starch-lipid binary complexes with high efficiency. Compared with traditional methods for preparing complexes, the method of the present application has the advantage that the technical barrier of complexing interaction between starch and a diglyceride is broken through achieving the complexing without adding any exogenous additives, and greatly improves the complexing efficiency of the starch and a lipid. The modified starch-lipid complexes prepared by the present application have a better V-type crystalline structure, short-range structure order, and thermal stability than a native starch-lipid complex, and can potentially improve the quality of food and the regulation and improvement of the nutrition and health of the human.

The basic principle, main characteristics, and advantages of the present disclosure are shown and described above. It should be understood by technical persons in the industry that the present disclosure is not limited by the above embodiments, and the above embodiments and descriptions in the specification are only intended to illustrate the principle of the present disclosure. Various changes and improvements to the present disclosure may also be made without departing from the spirit and scope of the present disclosure, and all the changes and improvements shall fall within the protection scope of the present disclosure as required. The protection scope of the present disclosure as required is defined by the attached claims and equivalents thereof.

All structural changes made from the concept of the present disclosure without creative effort fall within the protection scope of the present disclosure.

All structural changes made from the concept of the present disclosure without creative effort fall within the protection scope of the present disclosure.

TABLE 5

| | | | | Thermal properties of starch octenyl succinate and starch-lipid binary complexes | | | | | |
|---|---|---|---|---|---|---|---|---|---|
| Name | $T_{oI}$ (° C.) | $T_{pI}$ (° C.) | $T_{cI}$ (° C.) | $\Delta H_I$ (J/g) | $T_{oII}$ (° C.) | $T_{pII}$ (° C.) | $T_{cII}$ (C) | $\Delta H_{II}$ (J/g) | $\Delta H$ (J/g) |
| Comparative Example 1 | 97.7 ± 0.2a | 105.4 ± 0.1a | 110.9 ± 0.4a | 0.5 ± 0.1d | / | / | / | / | 0.5± 0.1d |
| Example 1 | 95.2 ± 0.1d | 99.5 ± 0.2d | 104.4 ± 0.2c | 1.2 ± 0.0c | 107.2 ± 0.1c | 111.1 ± 0.1c | 120.5 ± 0.1c | 1.7 ± 0.1b | 2.9 ± 0.1c |
| Example 2 | 95.8 ± 0.3c | 101.7 ± 0.1c | 106.5 ± 0.0b | 4.6 ± 0.1b | 110.8 ± 0.2b | 116.6 ± 0.1b | 123.4 ± 0.2b | 3.2 ± 0.1a | 7.8 ± 0.1b |
| Example 3 | 96.8 ± 0.1b | 104.6 ± 0.6b | 107.2 ± 0.1b | 5.0 ± 0.3a | 114.3 ± 0.1a | 119.0 ± 0.1a | 125.2 ± 0.4a | 3.3 ± 0.2a | 8.3 ± 0.2a |
| Comparative Example 2 | 94.3 ± 0.1a | 97.8 ± 0.1a | 103.6 ± 0.5a | 5.3 ± 0.1a | / | / | / | / | 5.3 ± 0.1d |
| Example 4 | 91.4 ± 0.0b | 97.0 ± 0.0b | 101.9 ± 0.1b | 5.0 ± 0.0b | 109.3 ± 0.1b | 114.6 ± 0.2a | 116.5 ± 0.2c | 1.5 ± 0.1b | 6.5 ± 0.1c |
| Example 5 | 89.8 ± 0.0b | 94.6 ± 0.3c | 98.7 ± 0.2c | 3.8 ± 0.1c | 103.4 ± 0.3c | 110.8 ± 0.0c | 118.4 ± 0.1b | 4.7 ± 0.1a | 8.5 ± 0.0b |
| Example 6 | 83.3 ± 0.1d | 92.8 ± 0.1d | 98.3 ± 0.1c | 5.1 ± 0.1b | 111.0 ± 0.1a | 112.6 ± 0.1b | 120.6 ± 0.3a | 4.9 ± 0.2a | 10.0 ± 0.2a |
| Comparative Example 3 | / | / | / | / | / | / | / | / | / |
| Example 7 | 95.1 ± 0.1a | 99.9 ± 0.1a | 107.8 ± 0.1a | 3.3 ± 0.1a | 109.6 ± 0.3a | 113.8 ± 0.1a | 116.3 ± 0.4b | 1.6 ± 0.2c | 4.9 ± 0.1c |
| Example 8 | 94.1 ± 0.1b | 99.6 ± 0.1b | 107.3 ± 0.1b | 2.9 ± 0.1b | 108.3 ± 0.2b | 112.6 ± 0.1b | 116.8 ± 0.5b | 3.3 ± 0.1b | 6.2 ± 0.1b |
| Example 9 | 93.8 ± 0.0c | 97.5 ± 0.1c | 101.2 ± 0.1c | 0.3 ± 0.1c | 107.7 ± 0.1b | 113.5 ± 0.1a | 118.0 ± 0.1a | 7.4 ± 0.1a | 7.7 ± 0.1a |

Note:

The data in the table are represented as mean ± standard deviation; the same suffic letter indicates no significant difference and different letters indicate significant differences ($p < 0.05$); and "/" indicates that no data is detected.

What is claimed is:

1. A preparation method of modified starch-lipid binary complexes, comprising:

(1) preparing a modified starch with octenyl succinic anhydride comprising taking corn starch into an aqueous ionic liquid to prepare a 10 wt % starch suspension, adjusting pH of the system to a pH of 8.0-8.5 by adding a sodium hydroxide solution with a concentration of 0.5 M, weighing octenyl succinic anhydride that accounts for 1%-9% of the mass of the starch on dry basis and adding into the starch suspension drop by drop within 2.5 h at a temperature of 25° C. to perform a modification reaction for modifying the corn starch, maintaining the modification reaction for 5 hours at a stirring rate of 200 rpm, adjusting pH of the reaction system to a pH of 6.0, centrifuging and washing the reaction mixture for 3 times, where the centrifuging is carried out for 10 minutes at a centrifugal force of 5,000 g, and the washing is carried out with distilled water and 70% ethanol alternately, then drying via vacuum at 40° C. for 12 hours to yield the modified starch with octenyl succinic anhydride, wherein the aqueous ionic liquid is prepared by mixing a 1-ethyl-3-methyl imidazole acetate ionic liquid with water at a mass ratio of 2:8;

(2) preparing a modified starch-lipid suspension comprising adding the modified starch with octenyl succinic anhydride prepared in step (1) into distilled water to yield a 7-20 wt % suspension by stirring, then adding a lipid to yield the modified starch-lipid suspension by stirring, wherein a mass ratio of the lipid to the modified starch on a dry basis is 1:(10-200), and the lipid is a long-chain fatty acid or a glyceride;

(3) heating the modified starch-lipid suspension obtained in step (2) in a magnetic stirring temperature control water bath for starch gelation and conducting freeze-drying and grinding, comprising 3A) in a preheating and uniform mixing stage, subjecting the modified starch-lipid suspension to preheating and stirring at a temperature of 50° C. at a stirring rate of 200 rpm for 2 min; 3B) in a heating and reaction stage, raising the temperature to 100° C. at a heating rate of 25° C./min, and carrying out a complexing reaction at a stirring rate of 260 rpm for 1 hours; 3C) in a cooling and formation stage, lowering the temperature to 25° C. at a cooling rate of 10° C./min and a stirring rate of 100 rpm to yield a gelatinized sample of a modified starch-lipid complex; and 3D) in a sample treating stage, rapidly placing the gelatinized sample in liquid nitrogen for cooling for 5 min, freeze-drying for 24 hours, grinding with a high-throughput liquid nitrogen freezing grinder with a rotor size of 6*Φ0.9 cm at a rotation speed of 10 cps for 10 min, and then sieving with a 100-mesh sieve to obtain the modified starch-lipid binary complexes.

2. The preparation method of modified starch-lipid binary complexes according to claim 1, wherein in step (2), adding the modified starch with octenyl succinic anhydride prepared in step (1) into distilled water, pre-mixing for 3 minutes and stirring at a stirring rate of 200 rpm to yield an 8 wt % suspension, then adding a lipid to yield the modified starch-lipid suspension by stirring for 2 minutes at a stirring rate of 260 rpm, wherein the mass ratio of the lipid to the modified starch on a dry basis is 1:200, 1:40, 1:20, and 1:10.

3. The preparation method of modified starch-lipid binary complexes according to claim 1, wherein the long-chain fatty acid is palmitic acid, and the glyceride is monoglyceride palmitate or diglyceride palmitate.

* * * * *